US012790533B2

(12) United States Patent
Patil et al.

(10) Patent No.: US 12,790,533 B2
(45) Date of Patent: Nov. 10, 2026

(54) SURFACTANT-FACILITATED STORAGE OF CARBON DIOXIDE IN A SUBTERRANEAN FORMATION

(71) Applicant: SAUDI ARABIAN OIL COMPANY, Dhahran (SA)

(72) Inventors: Pramod Dhanaji Patil, Dhahran (SA); Abdulaziz S. Al-Qasim, Dhahran (SA); Zuhair A. Al-Yousef, Dhahran (SA); Muhammad M. Almajid, Dhahran (SA); Ali A. Alyousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 151 days.

(21) Appl. No.: 18/499,050

(22) Filed: Oct. 31, 2023

(65) Prior Publication Data

US 2025/0136859 A1 May 1, 2025

(51) Int. Cl.

| | |
|---|---|
| ***C09K 8/58*** | (2006.01) |
| ***C09K 8/52*** | (2006.01) |
| ***C09K 8/584*** | (2006.01) |
| ***E21B 41/00*** | (2006.01) |

(52) U.S. Cl.

CPC ................ *C09K 8/584* (2013.01); *C09K 8/52* (2013.01); *E21B 41/0064* (2013.01)

(58) Field of Classification Search

CPC ............ C08G 65/2609; C08G 65/2663; E21B 43/164; E21B 43/166; E21B 41/0064; C09K 8/584; C09K 8/594; C09K 8/52; C09K 2208/22; B09C 1/00; B09C 1/002; B09C 1/08; B09B 3/70; B09B 3/60; B09B 3/30; B09B 3/20; B09B 3/10; B09B 3/00

See application file for complete search history.

(56) References Cited

U.S. PATENT DOCUMENTS

| | | | | |
|---|---|---|---|---|
| 3,330,346 | A * | 7/1967 | Jacobs | C09K 8/594 507/936 |
| 4,380,266 | A * | 4/1983 | Wellington | C09K 8/594 166/403 |
| 4,502,538 | A * | 3/1985 | Wellington | E21B 43/164 166/402 |
| 6,389,820 | B1 * | 5/2002 | Rogers | F17C 11/007 62/45.1 |
| 2004/0030206 | A1 * | 2/2004 | Dahlmann | C08F 220/282 585/15 |
| 2004/0200618 | A1 * | 10/2004 | Piekenbrock | E21B 41/0064 166/305.1 |
| 2007/0114022 | A1 * | 5/2007 | Nguyen | C09K 8/5083 507/224 |
| 2009/0260828 | A1 * | 10/2009 | Kubala | E21B 43/267 507/205 |
| 2010/0323928 | A1 * | 12/2010 | Kvamme | C01B 32/50 423/437.1 |
| 2014/0251607 | A1 * | 9/2014 | Sanders | C08G 65/2609 507/203 |

OTHER PUBLICATIONS

Kumar A., Sakpal T., Linga P., Kumar R., 2013 "Influence of contact medium and surfactants on carbon dioxide clathrate hydrate kinetics". Fuel vol. 105, p. 664-671.
Kumar A., Sakpal T., Linga P., Kumar R., 2015 "Role of surfactants in promoting gas hydrate formation", Ind. Eng. Chem. Res. vol. 54(49).
Zheng J., Chong Z. R., Qureshi F., Linga P., 2020 "Carbon dioxide sequestration via gas hydrates: a potential pathway toward decarbonization", Energy Fuels, vol. 34(9) p. 10529-10546.

* cited by examiner

*Primary Examiner* — Edwin J Toledo-Duran
(74) *Attorney, Agent, or Firm* — Vorys, Sater, Seymour and Pease LLP

(57) ABSTRACT

Carbon dioxide may be stored within a gas hydrate of a subterranean formation. For example, compositions for storage of carbon dioxide in a gas hydrate may comprise: a carbon dioxide phase; and a nonionic surfactant that is at least partially dissolved in the carbon dioxide phase, the nonionic surfactant including a first polyalkoxylated alcohol and a second polyalkoxylated alcohol, in which each polyalkoxylated alcohol is a reaction product of an aliphatic alcohol and one or more of ethylene oxide, propylene oxide, and butylene oxide.

11 Claims, No Drawings

SURFACTANT-FACILITATED STORAGE OF CARBON DIOXIDE IN A SUBTERRANEAN FORMATION

FIELD OF THE DISCLOSURE

The present disclosure relates generally to carbon capture and, more particularly, to subterranean storage of carbon dioxide.

BACKGROUND OF THE DISCLOSURE

Fossil fuels are a major contributor to greenhouse gas emissions. Use of fossil fuels will continue over at least the near future for purposes including heating and cooling, power generation, transportation, and industrial usage. Reducing greenhouse gas emissions, including carbon dioxide, are goals included in many energy transition plans. In particular, carbon capture, utilization, and storage (CCUS) is believed to be a promising approach for reducing greenhouse gas emissions over the forthcoming energy transition period. CCUS technologies allow for the capture of carbon dioxide from fuel combustion and other industrial processes, transportation of the carbon dioxide to a desired storage location, and storage of the carbon dioxide (e.g., in subterranean geological formations) for subsequent use as a resource to create products or to provide services (e.g., in industrial applications). As such, CCUS offers great potential for reducing emissions across much of the current energy ecosystem.

Gas hydrate formations, or gas hydrates, also known as clathrates, are crystalline solid constructs formed from water and gas under certain temperature and pressure conditions. Gas hydrates form when small, non-polar gas molecules become embedded within a network of hydrogen bonds from water molecules to define a solid lattice. Common gas hydrates may include a variety of embedded low molecular weight gasses including, for example, oxygen, hydrogen, carbon dioxide, nitrogen, methane, argon, and mixtures thereof. Naturally occurring gas hydrate formations may be found in various locations throughout the world, both upon land formations and below the ocean floor.

Carbon dioxide hydrates offer significant potential for subterranean storage of carbon dioxide, such as through a CCUS approach. Despite their significant potential, it may be difficult to encourage carbon dioxide hydrate formation when storing carbon dioxide downhole.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Nonlimiting example compositions of the present disclosure may comprise: a carbon dioxide phase; and a nonionic surfactant that is at least partially dissolved in the carbon dioxide phase, the nonionic surfactant comprising a first polyalkoxylated alcohol and a second polyalkoxylated alcohol, in which each polyalkoxylated alcohol is a reaction product of an aliphatic alcohol and one or more of ethylene oxide, propylene oxide, and butylene oxide; wherein the first polyalkoxylated alcohol has a structure represented by

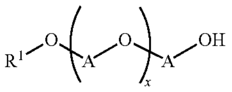

wherein: $R^1$ is a $C_2$ to $C_{20}$ straight-chain or branched alkyl group; A is $A^1$, $A^2$, or $A^3$, and $A^1$ is $-CH_2CH_2-$, $A^2$ is $-CH_2CH(CH_3)-$, and $A^3$ is $-CH_2CH(CH_2CH_3)-$; x is an integer ranging from 2 to 40, and there are $a^3$ occurrences of $A^3$ in the first polyalkoxylated alcohol, $a^2$ occurrences of $A^2$ in the first polyalkoxylated alcohol, and $a^1$ occurrences of $A^1$ in the first polyalkoxylated alcohol; wherein $a^3$ is an integer ranging from 0 to 5, $a^2$ is an integer ranging from 0 to 10, $a^1$ is an integer ranging from 1 to 25, and $a^1=x-(a^2+a^3)$; and wherein the second polyalkoxylated alcohol has a structure represented by

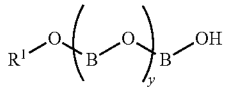

wherein: $R^2$ is a $C_2$ to $C_{20}$ straight-chain or branched alkyl group; B is $B^1$, $B^2$, or $B^3$, and $B^1$ is $-CH_2CH_2-$, $B^2$ is $-CH_2CH(CH_3)-$, and $B^3$ is $-CH_2CH(CH_2CH_3)-$; y is an integer ranging from x+4 to 65, and there are $b^3$ occurrences of $B^3$ in the second polyalkoxylated alcohol, $b^2$ occurrences of $B^2$ in the second polyalkoxylated alcohol, and $b^1$ occurrences of $B^1$ in the first polyalkoxylated alcohol; wherein $b^3$ is an integer ranging from 0 to 5, $b^2$ is an integer ranging from 0 to 10, $b^1$ is an integer ranging from $a^1+4$ to 50, and $b^1=y-(b^2+b^3)$.

Nonlimiting example methods of the present disclosure may comprise: combining a carbon dioxide phase and a nonionic surfactant, such that the nonionic surfactant is at least partially dissolved in the carbon dioxide phase, the nonionic surfactant comprising a first polyalkoxylated alcohol and a second polyalkoxylated alcohol, in which each polyalkoxylated alcohol is a reaction product of an aliphatic alcohol and one or more of ethylene oxide, propylene oxide, and butylene oxide; introducing the carbon dioxide phase and the nonionic surfactant into a subterranean formation; and storing the carbon dioxide phase and the nonionic surfactant as a combined phase within the subterranean formation.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to carbon capture and, more particularly, to subterranean storage of carbon dioxide.

The present disclosure includes methods and compositions to promote carbon dioxide storage within a subterranean formation, such as through forming a gas hydrate (e.g., a carbon dioxide hydrate or a mixed carbon dioxide hydrate). Storage of carbon dioxide in this manner may be cost effective and facilitate large-volume storage of carbon dioxide over extended periods of time.

In the disclosure herein, storage of carbon dioxide, preferably as a gas hydrate, may be facilitated by a nonionic surfactant having at least partial solubility in a carbon dioxide phase (e.g., liquid carbon dioxide, an aqueous carbon dioxide solution, a carbon dioxide hydrate, a mixed carbon dioxide hydrate, or any combination thereof). The nonionic surfactant may comprise at least two polyalkoxylated alcohols, as described compositionally hereinbelow. The use of two polyalkoxylated alcohols (one a hydrophilic polyalkoxylated alcohol and one a hydrophobic polyalkoxylated alcohol) may increase deliverability of the surfactant and facilitate gas hydrate formation. When combined with the carbon dioxide phase, the nonionic surfactant may encourage gas hydrate formation under suitable conditions within the subterranean formation to facilitate subterranean storage of the carbon dioxide. Without being bound by theory, the nonionic surfactant may alter the surface tension between the carbon dioxide phase and water to promote formation of the gas hydrate. Additionally, the nonionic surfactant may change the morphology of hydrate formation by increasing gas-water interactions and improving gas hydrate growth rates for promoting carbon dioxide storage. The subterranean formation may further contain a hydrate zone having conditions suitable to generate a gas hydrate, or the subterranean formation may initially be free of gas hydrates. In either case, the nonionic surfactant may increase the rate of gas hydrate formation under already-favorable conditions for forming a gas hydrate or facilitate gas hydrate formation under otherwise unfavorable conditions for forming a gas hydrate.

The nonionic surfactant may be present in an aqueous fluid that is combined with the carbon dioxide phase. The nonionic surfactant may be included in the aqueous fluid at a concentration ranging from about 0.1 wt % to about 5.0 wt %, or about 0.1 wt % to about 4.0 wt %, or about 0.1 wt % to about 3.0 wt %, or about 0.1 wt % to about 2.0 wt %, or about 0.1 wt % to about 1.0 wt %, or about 0.1 wt % to about 0.5 wt %, or about 0.2 wt % to about 0.5 wt %, based on total mass. When combined with a carbon dioxide phase, the same concentrations of the nonionic surfactant may apply, but in this case based on total mass excluding carbon dioxide. Suitable aqueous fluids used in the present disclosure may include, but are not limited to, fresh water (e.g., stream water, lake water, or municipal treated water), non-potable water such as gray water or industrial process water, sea water, brine, aqueous salt solutions, partially desalinated water, produced water (including brine and other salt water solutions), or any combination thereof.

The nonionic surfactant utilized in the disclosure herein may comprise a first polyalkoxylated alcohol and a second polyalkoxylated alcohol, in which each polyalkoxylated alcohol is a reaction product of an aliphatic alcohol and one or more of ethylene oxide, propylene oxide, and butylene oxide. As discussed above, one may be a hydrophilic polyalkoxylated alcohol and one may be a hydrophobic polyalkoxylated alcohol. As a nonlimiting example, a polyalkoxylated alcohol with a greater number of ethylene oxide groups may, without being bound by theory, be more hydrophilic, while a polyalkoxylated alcohol with more propylene oxide groups may, without being bound by theory, be more hydrophobic. The combination of hydrophilic and hydrophobic polyalkoxylated alcohols may allow for greater deliverability of the surfactant.

The first polyalkoxylated alcohol may have a structure represented by Formula 1A Formula 1A

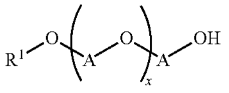

wherein:

$R^1$ is a $C_2$ to $C_{20}$ straight-chain or branched alkyl group;

A is $A^1$, $A^2$, or $A^3$, and $A^1$ is $—CH_2CH_2—$, $A^2$ is $—CH_2CH(CH_3)—$, and $A^3$ is $—CH_2CH(CH_2CH_3)—$;

x is an integer ranging from 2 to 40, and there are $a^3$ occurrences of $A^3$ in the first polyalkoxylated alcohol, $a^2$ occurrences of $A^2$ in the first polyalkoxylated alcohol, and $a^1$ occurrences of $A^1$ in the first polyalkoxylated alcohol; and $a^3$ is an integer ranging from 0 to 5, $a^2$ is an integer ranging from 0 to 10, and $a^1$ is an integer ranging from 1 to 25, and $a^1=x-(a^2+a^3)$.

The second polyalkoxylated alcohol may have a structure represented by Formula 1B Formula 1B

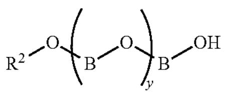

wherein:

$R^2$ is a $C_2$ to $C_{20}$ straight-chain or branched alkyl group;

B is $B^1$, $B^2$, or $B^3$, and $B^1$ is $—CH_2CH_2—$, $B^2$ is $—CH_2CH(CH_3)—$, and $B^3$ is $—CH_2CH(CH_2CH_3)—$;

y is an integer ranging from x+4 to 65, and there are $b^3$ occurrences of $B^3$ in the second polyalkoxylated alcohol, $b^2$ occurrences of $B^2$ in the second polyalkoxylated alcohol, and $b^1$ occurrences of $B^1$ in the second polyalkoxylated alcohol; and $b^3$ is an integer ranging from 0 to 5, $b^2$ is an integer ranging from 0 to 10, and $b^1$ is an integer ranging from $a^1$+4 to 50, and $b^1=y-(b^2+b^3)$.

Preferably, the first polyalkoxylated alcohol and the second polyalkoxylated alcohol contain at least $A^1$ and $B^1$, respectively, and optionally at least some of $A^2$ and $B^2$, respectively. Preferably, $a^1>a^2$ and/or $b^1>b^2$. More preferably $a^1>a^3$ and/or $b^1>b^3$, still more preferably $(a^1+a^2)>a^3$ and/or $(b^1+b^2)>a^3$, and still more preferably $a^1>(a^2+a^3)$ and/or $b^1>(b^2+b^3)$.

The first polyalkoxylated alcohol and the second polyalkoxylated alcohol may be present in the nonionic surfactant at any suitable ratio. For example, a molar ratio of the first polyalkoxylated alcohol to the second polyalkoxylated alcohol may range from about 1:50 to about 50:1, or about 1:25 to about 25:1, or about 1:2 to about 2:1, or about 1:1 (equimolar).

Compositions of the present disclosure therefore may comprise a carbon dioxide phase and a nonionic surfactant (as specified above) at least partially dissolved in the carbon dioxide phase. Such compositions are inclusive of those formed before introducing the carbon dioxide and the nonionic surfactant into a subterranean formation, after introducing the carbon dioxide and the nonionic surfactant into a subterranean formation, as well as compositions that are formed within a subterranean formation itself (e.g., a carbon dioxide hydrate, a mixed carbon dioxide hydrate, or any combination thereof). The carbon dioxide phase may therefore include, but is not limited to, liquid carbon dioxide, aqueous carbon dioxide solutions, a carbon dioxide hydrate, a mixed carbon dioxide hydrate, or any combination thereof. Compositions formed from an aqueous carbon dioxide solution and/or defining a carbon dioxide hydrate may feature a high loading of carbon dioxide relative to aqueous fluid, such as a mass ratio of aqueous fluid ranging from about 1:5 to about 1:30. As such, the present disclosure may facilitate high-capacity storage of carbon dioxide within a given volume of a subterranean formation.

To promote carbon dioxide storage within a subterranean formation, the nonionic surfactant may be provided to a carbon dioxide phase being introduced to a subterranean formation. The carbon dioxide phase may be introduced to the subterranean formation before the nonionic surfactant, the nonionic surfactant may be introduced to the subterranean formation before the carbon dioxide phase, and/or the nonionic surfactant may be introduced to the subterranean formation concurrently, such as in a blend having the nonionic surfactant at least partially dissolved in the carbon dioxide phase.

Accordingly, methods of the present disclosure may comprise: combining a carbon dioxide phase and a nonionic surfactant, such that the nonionic surfactant is at least partially dissolved in the carbon dioxide phase, the nonionic surfactant comprising a first polyalkoxylated alcohol and a second polyalkoxylated alcohol, in which each polyalkoxylated alcohol is a reaction product of an aliphatic alcohol and one or more of ethylene oxide, propylene oxide, and butylene oxide; introducing the carbon dioxide phase and the nonionic surfactant into a subterranean formation; and storing the carbon dioxide phase and the nonionic surfactant as a combined phase within the subterranean formation. The first polyalkoxylated alcohol and the second polyalkoxylated alcohol may include those specified in further detail above. Preferably, the combined phase comprising the carbon dioxide phase and the nonionic surfactant may be stored within the subterranean formation as a carbon dioxide hydrate, a mixed carbon dioxide hydrate, or any combination thereof.

The subterranean formation to which the nonionic surfactant and the carbon dioxide phase are introduced may contain an existing gas hydrate (inclusive of methane hydrates, as well as carbon dioxide hydrates and/or mixed carbon dioxide hydrates) or comprise a hydrate zone that has suitable conditions for forming gas hydrates. The capacity of a given gas hydrate to store carbon dioxide therein may depend on factors including, but not limited to, temperature of the formation, geology of the gas hydrate and/or surroundings, the concentration of carbon dioxide used, the surfactant used, the like, or any combination thereof. Subterranean formations containing existing gas hydrates or comprising a hydrate zone may be found in a number of locations including, but not limited to, a permafrost formation, a seabed (e.g., ocean bed), or the like. Gas hydrates or hydrate zones may conventionally be found within a subterranean formation at a subsurface depth of about 500 meters to about 1,000 meters, though gas hydrate formations and hydrate zones may exist at subsurface depths outside the foregoing range.

To promote gas hydrate formation, the nonionic surfactant may be provided to a carbon dioxide phase being introduced to a subterranean formation. The nonionic surfactant and the carbon dioxide phase may be introduced to the subterranean formation in any suitable fashion, either together, separately, concurrently, or sequentially. The carbon dioxide phase and the nonionic surfactant may be in contact within the subterranean formation, including within a gas hydrate of a subterranean formation, such that the nonionic surfactant may encourage formation of a gas hydrate within the subterranean formation.

Suitable carbon dioxide phases that may be utilized for introduction to a subterranean formation include, but are not limited to, liquid carbon dioxide, aqueous carbon dioxide solutions, or any combination thereof. When introduced as an aqueous carbon dioxide solution comprising an aqueous fluid and carbon dioxide (i.e., a combined phase), the carbon dioxide may be dissolved therein at a ratio of aqueous fluid to carbon dioxide ranging from about 1:5 to about 1:40, or about 1:5 to about 1:30, or about 1:10 to about 1:30, or about 1:5 to about 1:20, based on total mass of the aqueous carbon dioxide solution.

The carbon dioxide phase and/or the nonionic surfactant may be introduced to the subterranean formation at any suitable pressure, including a pressure of about 10 psi to about 10,000 psi, or about 10 psi to about 1,000 psi, or about 100 psi to about 10,000 psi, or about 100 psi to about 500 psi, or about 500 psi to about 2500 psi, or about 10,000 psi or greater. When introduced to the subterranean formation separately, the carbon dioxide phase and the nonionic surfactant may be introduced to the subterranean formation at the same pressure or at different pressures.

The carbon dioxide phase and/or the nonionic surfactant may be introduced to the subterranean formation at any suitable temperature, including a temperature of about 5° C. to about 200° C., or about 5° C. to about 100° C. Within the subterranean formation, the carbon dioxide phase and/or the nonionic surfactant may acquire the ambient formation temperature, or additional heating may take place with a heater placed downhole. When introduced to the subterranean formation separately, the carbon dioxide phase and the nonionic surfactant may be introduced to the subterranean formation at the same temperature or at different temperatures. Temperatures within the aforementioned ranges that are above or below ambient temperature of surrounding environment or within the subterranean formation may be achieved with a suitable heater, chiller, or other such temperature control device, such as an inline heater and/or an inline chiller. One of ordinary skill in the art will be able to select and implement an appropriate temperature control device with the benefit of the present disclosure.

Combinations of the foregoing approaches for introducing the carbon dioxide phase and the nonionic surfactant may be used. As a first nonlimiting example, a first portion of the carbon dioxide phase may be introduced to the subterranean formation as liquid carbon dioxide before introduction of a first portion of the nonionic surfactant. Subsequently, a combined fluid comprising a second portion of the nonionic surfactant and a second portion of the carbon dioxide phase (or a different carbon dioxide phase, such as an aqueous carbon dioxide solution) may be introduced to the subterranean formation. As a second nonlimiting example, a combined fluid comprising a first portion of the nonionic surfactant fluid and a first portion of the carbon dioxide phase (e.g., an aqueous carbon dioxide solution) may be introduced to the subterranean formation. Subsequently, a second portion of the carbon dioxide phase (or a different carbon dioxide phase) may be introduced to the subterranean formation after introduction of the combined fluid, preferably wherein the second portion of the carbon dioxide phase comprises an aqueous carbon dioxide solution.

A preflush fluid may be introduced to the subterranean formation prior to introducing the carbon dioxide phase and/or the nonionic surfactant fluid. The preflush fluid may comprise any suitable fluid, including an aqueous fluid. Without being bound by theory, the preflush fluid may serve functions including, but not limited to, for example, chemically preparing a gas hydrate within the subterranean formation to receive carbon dioxide, removing and/or destabilizing an existing gas hydrate from the subterranean formation, conditioning the subterranean formation or a hydrate zone thereof to receive carbon dioxide, or any combination thereof. The preflush may increase the capacity of the subterranean formation to receive the carbon dioxide. The preflush fluid may optionally be flowed back to the wellhead of the subterranean formation following introduction and conditioning of the subterranean formation.

Optionally, nonionic surfactants, aqueous fluids containing the nonionic surfactants, and compositions containing the nonionic surfactants may further include a pour point depressant, which may preferably comprise a solvent or a polymer. Suitable polymers may include high molecular weight polymers, such as, but not limited to, an alkylaromatic polymer, a polymethacrylate, an alkylated wax naphthalene, an alkylated wax phenol, the like, or any combination thereof. The pour point depressant, if included, may be present within an aqueous fluid containing the nonionic surfactant in an amount ranging from about 0.025 wt % to about 1.0 wt %, or about 0.025 wt % to about 0.5 wt %, or about 0.025 wt % to about 0.1 wt %, or about 0.025 wt % to about 0.05 wt %, based on a total mass (excluding the carbon dioxide mass when present in a composition containing carbon dioxide). Upon addition of the optional pour point depressant, an aqueous solution of the nonionic surfactant may have a pour point ranging from about −75° C. to about −40° C., or about −75° C. to about −60° C., or about −65° C. to about −54° C., or about −75° C. to about −50° C., or about −75° C. to about −54° C.

The compositions, carbon dioxide phases, and/or the nonionic surfactants described herein may further include one or more additional components, provided that the one or more additional components do not adversely affect and are compatible with carbon dioxide storage operations described herein. Examples of suitable additional components may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a mutual solvent, an oxidizer, a reducer, a friction reducer, a clay stabilizing agent, an iron control agent, the like, or any combination thereof. Suitable examples of the foregoing will be familiar to one having ordinary skill in the art.

System capable of introducing a carbon dioxide phase and/or a suitably formulated nonionic surfactant to a subterranean location may include one or more wellheads. Each wellhead may be fluidly connected to the subterranean location via a tubing and wellbore extending into a well within the subterranean location. Wells of interest in the present disclosure for introduction of the foregoing to the subterranean location may include primarily horizontal wells and/or primarily vertical wells. The tubing within the wellbore may supply the foregoing to the subterranean location, wherein each may be supplied to the wellhead from one or more storage locations. The systems may further comprise one or more pumps, one or more compressors, or any combination thereof fluidly connected to the wellhead to accomplish introduction of the foregoing to the subterranean formation. The one or more pumps, the one or more compressors, or any combination thereof may be used to pressurize fluids individually or in combination to promote delivery to the subterranean formation. Components may be supplied to the wellhead from any suitable source including, but not limited to, pipelines, storage tanks, tank railcars, tanker trucks, the like, or any combination thereof.

Embodiments disclosed herein include:

A. Compositions comprising: a carbon dioxide phase; and a nonionic surfactant that is at least partially dissolved in the carbon dioxide phase, the nonionic surfactant comprising a first polyalkoxylated alcohol and a second polyalkoxylated alcohol, in which each polyalkoxylated alcohol is a reaction product of an aliphatic alcohol and one or more of ethylene oxide, propylene oxide, and butylene oxide; wherein the first polyalkoxylated alcohol has a structure represented by

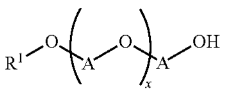

wherein: $R^1$ is a $C_2$ to $C_{20}$ straight-chain or branched alkyl group; A is $A^1$, $A^2$, or $A^3$, and $A^1$ is $—CH_2CH_2—$, $A^2$ is $—CH_2CH(CH_3)—$, and $A^3$ is $—CH_2CH(CH_2CH_3)—$; x is an integer ranging from 2 to 40, and there are $a^3$ occurrences of $A^3$ in the first polyalkoxylated alcohol, $a^2$ occurrences of $A^2$ in the first polyalkoxylated alcohol, and $a^1$ occurrences of $A^1$ in the first polyalkoxylated alcohol; wherein $a^3$ is an integer ranging from 0 to 5, $a^2$ is an integer ranging from 0 to 10, $a^1$ is an integer ranging from 1 to 25, and $a^1=x-(a^2+a^3)$; and wherein the second polyalkoxylated alcohol has a structure represented by

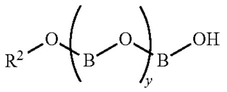

wherein: $R^2$ is a $C_2$ to $C_{20}$ straight-chain or branched alkyl group; B is $B^1$, $B^2$, or $B^3$, and $B^1$ is $—CH_2CH_2—$, $B^2$ is $—CH_2CH(CH_3)—$, and $B^3$ is $—CH_2CH(CH_2CH_3)—$; y is an integer ranging from x+4 to 65, and there are $b^3$ occurrences of $B^3$ in the second polyalkoxylated alcohol, $b^2$ occurrences of $B^2$ in the second polyalkoxylated alcohol, and $b^1$ occurrences of $B^1$ in the first polyalkoxylated alcohol; wherein $b^3$ is an integer ranging from 0 to 5, $b^2$ is an integer ranging from 0 to 10, $b^1$ is an integer ranging from $a^1+4$ to 50, and $b^1=y-(b^2+b^3)$.

A1. Gas hydrates comprising the composition of A.

B. Methods for capturing carbon dioxide. The methods comprise: combining a carbon dioxide phase and a nonionic surfactant, such that the nonionic surfactant is at least partially dissolved in the carbon dioxide phase, the nonionic surfactant comprising a first polyalkoxylated alcohol and a second polyalkoxylated alcohol, in which each polyalkoxylated alcohol is a reaction product of an aliphatic alcohol and one or more of ethylene oxide, propylene oxide, and butylene oxide; introducing the carbon dioxide phase and the nonionic surfactant into a subterranean formation; and storing the carbon dioxide phase and the nonionic surfactant as a combined phase within the subterranean formation.

Each of embodiments A, A1, and B may have one or more of the following additional elements in any combination:

Element 1: wherein $a^1>a^2$ and/or $b^1>b^2$.

Element 2: wherein the carbon dioxide phase comprises liquid carbon dioxide, an aqueous carbon dioxide solution, a carbon dioxide hydrate, a mixed carbon dioxide hydrate, or any combination thereof.

Element 3: wherein the carbon dioxide phase comprises an aqueous carbon dioxide solution or a carbon dioxide hydrate having a mass ratio of aqueous fluid to carbon dioxide ranging from about 1:5 to about 1:30.

Element 4: wherein a concentration of the nonionic surfactant in the composition ranges from about 0.1 wt % to about 5.0 wt %, based on total mass excluding carbon dioxide.

Element 5: further comprising a pour point depressant.

Element 6: wherein the combined phase is stored within the subterranean formation as a carbon dioxide hydrate, a mixed carbon dioxide hydrate, or any combination thereof.

Element 7: wherein the subterranean formation contains an existing gas hydrate or comprises a hydrate zone.

Element 8: wherein the first polyalkoxylated alcohol has a structure represented by

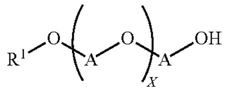

wherein: $R^1$ is a $C_2$ to $C_{20}$ straight-chain or branched alkyl group; A is $A^1$, $A^2$, or $A^3$, and $A^1$ is —$CH_2CH_2$—, $A^2$ is —$CH_2CH(CH_3)$—, and $A^3$ is —$CH_2CH(CH_2CH_3)$—; x is an integer ranging from 2 to 40, and there are $a^3$ occurrences of $A^3$ in the first polyalkoxylated alcohol, $a^2$ occurrences of $A^2$ in the first polyalkoxylated alcohol, and $a^1$ occurrences of $A^1$ in the first polyalkoxylated alcohol; wherein $a^3$ is an integer ranging from 0 to 5, $a^2$ is an integer ranging from 0 to 10, $a^1$ is an integer ranging from 1 to 25, and $a^1=x-(a^2+a^3)$; and wherein the second polyalkoxylated alcohol has a structure represented by

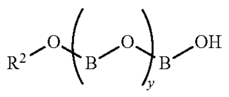

wherein: $R^2$ is a $C_2$ to $C_{20}$ straight-chain or branched alkyl group; B is $B^1$, $B^2$, or $B^3$, and $B^1$ is —$CH_2CH_2$—, $B^2$ is —$CH_2CH(CH_3)$—, and $B^3$ is —$CH_2CH(CH_2CH_3)$—; y is an integer ranging from x+4 to 65, and there are $b^3$ occurrences of $B^3$ in the second polyalkoxylated alcohol, $b^2$ occurrences of $B^2$ in the second polyalkoxylated alcohol, and $b^1$ occurrences of $B^1$ in the first polyalkoxylated alcohol; wherein $b^3$ is an integer ranging from 0 to 5, $b^2$ is an integer ranging from 0 to 10, $b^1$ is an integer ranging from $a^1$+4 to 50, and $b^1=y-(b^2+b^3)$.

Element 9: further comprising: introducing a preflush fluid to the subterranean formation prior to introducing the carbon dioxide phase and the nonionic surfactant, the preflush fluid comprising an aqueous fluid.

Element 10: wherein the carbon dioxide phase comprises liquid carbon dioxide, an aqueous carbon dioxide solution, or any combination thereof.

Element 11: wherein the combined phase has a mass ratio of aqueous fluid to carbon dioxide ranging from about 1:5 to about 1:30.

Element 12: wherein the carbon dioxide phase is introduced to the subterranean formation before the nonionic surfactant.

Element 13: wherein the nonionic surfactant is introduced to the subterranean formation before the carbon dioxide phase.

Element 14: wherein the nonionic surfactant and carbon dioxide phase are introduced to the subterranean formation concurrently.

Element 15: wherein the nonionic surfactant is at least partially dissolved in the carbon dioxide phase.

Element 16: wherein the nonionic surfactant is present in an aqueous fluid that is combined with the carbon dioxide phase.

Element 17: wherein the aqueous fluid further contains a pour point depressant.

Element 18: wherein a concentration of the pour point depressant in the aqueous fluid ranges from about 0.025 wt % to about 1.0 wt %, based on total mass.

Element 19: wherein the carbon dioxide phase, the nonionic surfactant, or any combination thereof are introduced to the subterranean formation at a temperature ranging from about 5° C. to about 200° C.

By way of non-limiting example, exemplary combinations applicable to A and A1 include, but are not limited to: 1 and 2; 1 and 10; 1-3; 1, 2, and 4; and 1, 4, and 5.

Furthermore, exemplary combinations applicable to B include, but are not limited to: 1 and 8; 1, 2, and 8; 1, 8 and 10; 8 and 9; 8 and 10; 8, 10 and 11; 8, 11 and 12; 1, 8 and 12; 1, 8 and 13; 1, 8 and 14; 1, 8, and 15; 1, 8, 15, and 16; 8 and 17; 8, 17, and 18; 8 and 19; 6 or 7, and 8; 6 or 7, and 9; 6 or 7, and 10; 6 or 7, and 11; 6 or 7, and 12; 6 or 7, and 13; 6 or 7, and 14; 6 or 7, and 15; 6 or 7, and 16; 6 or 7, and 17; 6 or 7, 17 and 18; 8 and 11; 8 and 14; 8 and 15; and 8 and 16.

Additional embodiments disclosed herein include:

Clause 1. A composition comprising: a carbon dioxide phase; and a nonionic surfactant that is at least partially dissolved in the carbon dioxide phase, the nonionic surfactant comprising a first polyalkoxylated alcohol and a second polyalkoxylated alcohol, in which each polyalkoxylated alcohol is a reaction product of an aliphatic alcohol and one or more of ethylene oxide, propylene oxide, and butylene oxide; wherein the first polyalkoxylated alcohol has a structure represented by

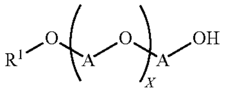

wherein: $R^1$ is a $C_2$ to $C_{20}$ straight-chain or branched alkyl group; A is $A^1$, $A^2$, or $A^3$, and $A^1$ is —$CH_2CH_2$—, $A^2$ is —$CH_2CH(CH_3)$—, and $A^3$ is —$CH_2CH(CH_2CH_3)$—; x is an integer ranging from 2 to 40, and there are $a^3$ occurrences of $A^3$ in the first polyalkoxylated alcohol, $a^2$ occurrences of $A^2$ in the first polyalkoxylated alcohol, and $a^1$ occurrences of $A^1$ in the first polyalkoxylated alcohol; wherein $a^3$ is an integer ranging from 0 to 5, $a^2$ is an integer ranging from 0 to 10, $a^1$ is an integer ranging from 1 to 25, and $a^1=x-(a^2+a^3)$; and wherein the second polyalkoxylated alcohol has a structure represented by

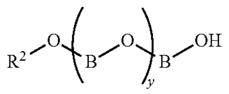

wherein: $R^2$ is a $C_2$ to $C_{20}$ straight-chain or branched alkyl group; B is $B^1$, $B^2$, or $B^3$, and $B^1$ is $—CH_2CH_2—$, $B^2$ is $—CH_2CH(CH_3)—$, and $B^3$ is $—CH_2CH(CH_2CH_3)—$; y is an integer ranging from x+4 to 65, and there are $b^3$ occurrences of $B^3$ in the second polyalkoxylated alcohol, $b^2$ occurrences of $B^2$ in the second polyalkoxylated alcohol, and $b^1$ occurrences of $B^1$ in the first polyalkoxylated alcohol; wherein $b^3$ is an integer ranging from 0 to 5, $b^2$ is an integer ranging from 0 to 10, $b^1$ is an integer ranging from $a^1$+4 to 50, and $b^1$=y−($b^2$+$b^3$).

Clause 2. The composition of clause 1, wherein $a^1>a^2$ and/or $b^1>b^2$.

Clause 3. The composition of clause 1 or clause 2, wherein the carbon dioxide phase comprises liquid carbon dioxide, an aqueous carbon dioxide solution, a carbon dioxide hydrate, a mixed carbon dioxide hydrate, or any combination thereof.

Clause 4. The composition of clause 1 or clause 2, wherein the carbon dioxide phase comprises an aqueous carbon dioxide solution or a carbon dioxide hydrate having a mass ratio of aqueous fluid to carbon dioxide ranging from about 1:5 to about 1:30.

Clause 5. The composition of clause 4, wherein a concentration of the nonionic surfactant in the composition ranges from about 0.1 wt % to about 5.0 wt %, based on total mass excluding carbon dioxide.

Clause 6. The composition of any one of clauses 1-5, further comprising a pour point depressant.

Clause 7. A gas hydrate comprising the composition of any one of clauses 1, 2, 5, or 6.

Clause 8. A method comprising: combining a carbon dioxide phase and a nonionic surfactant, such that the nonionic surfactant is at least partially dissolved in the carbon dioxide phase, the nonionic surfactant comprising a first polyalkoxylated alcohol and a second polyalkoxylated alcohol, in which each polyalkoxylated alcohol is a reaction product of an aliphatic alcohol and one or more of ethylene oxide, propylene oxide, and butylene oxide; introducing the carbon dioxide phase and the nonionic surfactant into a subterranean formation; and storing the carbon dioxide phase and the nonionic surfactant as a combined phase within the subterranean formation.

Clause 9. The method of clause 8, wherein the combined phase is stored within the subterranean formation as a carbon dioxide hydrate, a mixed carbon dioxide hydrate, or any combination thereof.

Clause 10. The method of clause 8 or clause 9, wherein the subterranean formation contains an existing gas hydrate or comprises a hydrate zone.

Clause 11. The method of any one of clauses 8-10, wherein the first polyalkoxylated alcohol has a structure represented by

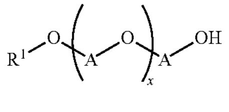

wherein: $R^1$ is a $C_2$ to $C_{20}$ straight-chain or branched alkyl group; A is $A^1$, $A^2$, or $A^3$, and $A^1$ is $—CH_2CH_2—$, $A^2$ is $—CH_2CH(CH_3)—$, and $A^3$ is $—CH_2CH(CH_2CH_3)—$; x is an integer ranging from 2 to 40, and there are $a^3$ occurrences of $A^3$ in the first polyalkoxylated alcohol, $a^2$ occurrences of $A^2$ in the first polyalkoxylated alcohol, and $a^1$ occurrences of $A^1$ in the first polyalkoxylated alcohol; wherein $a^3$ is an integer ranging from 0 to 5, $a^2$ is an integer ranging from 0 to 10, $a^1$ is an integer ranging from 1 to 25, and $a^1$=x−($a^2$+$a^3$); and wherein the second polyalkoxylated alcohol has a structure represented by

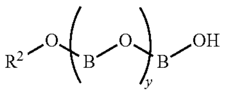

wherein: $R^2$ is a $C_2$ to $C_{20}$ straight-chain or branched alkyl group; B is $B^1$, $B^2$, or $B^3$, and $B^1$ is $—CH_2CH_2—$, $B^2$ is $—CH_2CH(CH_3)—$, and $B^3$ is $—CH_2CH(CH_2CH_3)—$; y is an integer ranging from x+4 to 65, and there are $b^3$ occurrences of $B^3$ in the second polyalkoxylated alcohol, $b^2$ occurrences of $B^2$ in the second polyalkoxylated alcohol, and $b^1$ occurrences of $B^1$ in the first polyalkoxylated alcohol; wherein $b^3$ is an integer ranging from 0 to 5, $b^2$ is an integer ranging from 0 to 10, $b^1$ is an integer ranging from $a^1$+4 to 50, and $b^1$=y−($b^2$+$b^3$).

Clause 12. The method of clause 11, wherein $a^1>a^2$ and/or $b^1>b^2$.

Clause 13. The method of any one of clauses 8-12, further comprising: introducing a preflush fluid to the subterranean formation prior to introducing the carbon dioxide phase and the nonionic surfactant, the preflush fluid comprising an aqueous fluid.

Clause 14. The method of any one of clauses 8-13, wherein the carbon dioxide phase comprises liquid carbon dioxide, an aqueous carbon dioxide solution, or any combination thereof.

Clause 15. The method of any one of clauses 8-14, wherein the combined phase has a mass ratio of aqueous fluid to carbon dioxide ranging from about 1:5 to about 1:30.

Clause 16. The method of any one of clauses 8-15, wherein the carbon dioxide phase is introduced to the subterranean formation before the nonionic surfactant.

Clause 17. The method of any one of clauses 8-15, wherein the nonionic surfactant is introduced to the subterranean formation before the carbon dioxide phase.

Clause 18. The method of any one of clauses 8-15, wherein the nonionic surfactant and carbon dioxide phase are introduced to the subterranean formation concurrently.

Clause 19. The method of clause 18, wherein the nonionic surfactant is at least partially dissolved in the carbon dioxide phase.

Clause 20. The method of any one of clauses 8-19, wherein the nonionic surfactant is present in an aqueous fluid that is combined with the carbon dioxide phase.

Clause 21. The method of clause 20, wherein a concentration of the nonionic surfactant in the aqueous fluid ranges from about 0.1 wt % to about 5.0 wt %, based on total mass.

Clause 22. The method of clause 20 or clause 21, wherein the aqueous fluid further contains a pour point depressant.

Clause 23. The method of clause 22, wherein a concentration of the pour point depressant in the aqueous fluid ranges from about 0.025 wt % to about 1.0 wt %, based on total mass.

Clause 24. The method of any one of clauses 8-23, wherein the carbon dioxide phase, the nonionic surfactant, or any combination thereof are introduced to the subterranean formation at a temperature ranging from about 5° C. to about 200° C.

The terminology used herein is for the purpose of describing particular embodiments only and is not intended to be limiting of the invention. As used herein, for example, the singular forms “a,” “an,” and “the” are intended to include the plural forms as well, unless the context clearly indicates otherwise. It will be further understood that the terms “contains,” “containing,” “includes,” “including,” “comprises,” and/or “comprising,” and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of “third” does not imply there must be a corresponding “first” or “second.” Also, if used herein, the terms “coupled” or “coupled to” or “connected” or “connected to” or “attached” or “attached to” may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:

combining a carbon dioxide phase and a nonionic surfactant, such that the nonionic surfactant is at least partially dissolved in the carbon dioxide phase, the nonionic surfactant comprising a first polyalkoxylated alcohol and a second polyalkoxylated alcohol, in which each polyalkoxylated alcohol is a reaction product of an aliphatic alcohol and one or more of ethylene oxide, propylene oxide, and butylene oxide;

wherein the first polyalkoxylated alcohol has a structure represented by

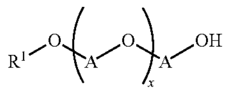

wherein:

$R^1$ is a $C_2$ to $C_{20}$ straight-chain or branched alkyl group;

A is $A^1$, $A^2$, or $A^3$, and $A^1$ is —$CH_2CH_2$—, $A^2$ is —$CH_2CH(CH_3)$—, and $A^3$ is —$CH_2CH(CH_2CH_3)$—;

x is an integer ranging from 2 to 40, and there are $a^3$ occurrences of $A^3$ in the first polyalkoxylated alcohol, $a^2$ occurrences of $A^2$ in the first polyalkoxylated alcohol, and $a^1$ occurrences of $A^1$ in the first polyalkoxylated alcohol;

wherein $a^3$ is an integer ranging from 0 to 5, $a^2$ is an integer ranging from 0 to 10, $a^1$ is an integer ranging from 1 to 25, and $a^1=x-(a^2+a^3)$; and wherein the second polyalkoxylated alcohol has a structure represented by

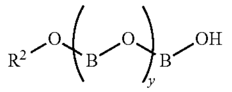

wherein:

$R^2$ is a $C_2$ to $C_{20}$ straight-chain or branched alkyl group;

B is $B^1$, $B^2$, or $B^3$, and $B^1$ is —$CH_2CH_2$—, $B^2$ is —$CH_2CH(CH_3)$—, and $B^3$ is —$CH_2CH(CH_2CH_3)$—;

y is an integer ranging from x+4 to 65, and there are $b^3$ occurrences of $B^3$ in the second polyalkoxylated alcohol, $b^2$ occurrences of $B^2$ in the second polyalkoxylated alcohol, and $b^1$ occurrences of $B^1$ in the first polyalkoxylated alcohol;

wherein $b^3$ is an integer ranging from 0 to 5, $b^2$ is an integer ranging from 0 to 10, $b^1$ is an integer ranging from $a^1$+4 to 50, and $b^1=y-(b^2+b^3)$;

introducing the carbon dioxide phase and the nonionic surfactant into a subterranean formation; and storing the carbon dioxide phase and the nonionic surfactant as a combined phase within the subterranean formation, the combined phase comprising a carbon dioxide hydrate, a mixed carbon dioxide hydrate, or any combination thereof.

2. The method of claim 1, wherein the subterranean formation contains an existing gas hydrate or comprises a hydrate zone.

3. The method of claim 1, wherein $a^1>a^2$ and/or $b^1>b^2$.

4. The method of claim 1, further comprising:

introducing a preflush fluid to the subterranean formation prior to introducing the carbon dioxide phase and the nonionic surfactant, the preflush fluid comprising an aqueous fluid.

5. The method of claim 1, wherein the carbon dioxide phase comprises liquid carbon dioxide, an aqueous carbon dioxide solution, or any combination thereof.

6. The method of claim 1, wherein the combined phase has a mass ratio of aqueous fluid to carbon dioxide ranging from about 1:5 to about 1:30.

7. The method of claim 1, wherein the carbon dioxide phase is introduced to the subterranean formation before the nonionic surfactant.

8. The method of claim 1, wherein the nonionic surfactant is introduced to the subterranean formation before the carbon dioxide phase.

9. The method of claim 1, wherein the nonionic surfactant and carbon dioxide phase are introduced to the subterranean formation concurrently.

10. The method of claim 1, wherein the nonionic surfactant is present in an aqueous fluid that is combined with the carbon dioxide phase.

11. The method of claim 10, wherein a concentration of the nonionic surfactant in the aqueous fluid ranges from about 0.1 wt % to about 5.0 wt %, based on total mass.

* * * * *